May 29, 1956     M. J. KOFOID     2,747,635

ELECTRIC NUT CRACKING

Filed July 25, 1952     2 Sheets—Sheet 1

*INVENTOR.*
MELVIN J. KOFOID
BY
ATTORNEY

May 29, 1956  M. J. KOFOID  2,747,635
ELECTRIC NUT CRACKING
Filed July 25, 1952  2 Sheets-Sheet 2
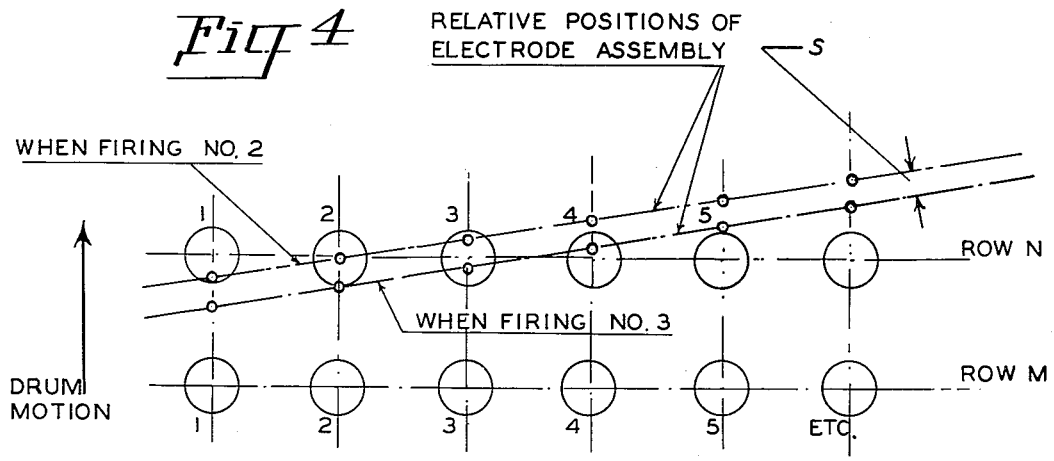
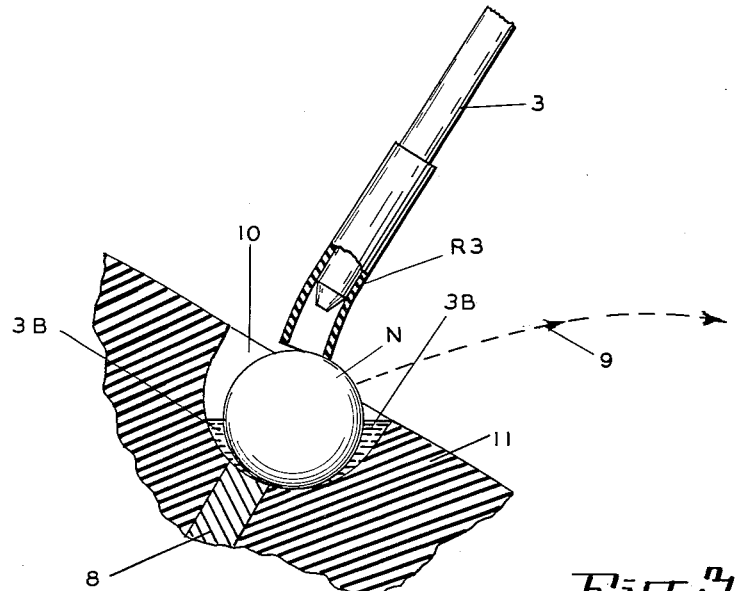
INVENTOR.
MELVIN J. KOFOID
ATTORNEY

United States Patent Office 2,747,635
Patented May 29, 1956

2,747,635
ELECTRIC NUT CRACKING

Melvin J. Kofoid, Seattle, Wash., assignor to Northwest Nut Growers, Portland, Oreg., a corporation of Oregon Application July 25, 1952, Serial No. 300,897

4 Claims. (Cl. 146—227)

This invention relates to electric nut cracking of the general type disclosed in applicant's co-pending application Serial No. 97,336, filed June 6, 1949, now Patent No. 2,609,942.

By methods disclosed infra, shells can be exploded outwardly, meats can be recovered in by far better condition than by any other way of shell removal and with much less waste, caused by crumbling and breakage of the meats as by compression or impact rupture of the nut shell.

Characterized for electric cracking there are two kinds of nuts, but they have one feature in common, viz., a high dielectric strength shell that cannot be penetrated by reasonably practical high voltage, high current electric surge discharge necessary to explode the nut shell away from the meat of the nut, without special steps to prevent flashover. The two kinds of nuts may be conveniently identified as (1) solid shell nuts such as filberts, macadamian nuts and the like (there are many varieties), that have no natural holes at opposite ends of their longer axes, and (2) nuts which have natural holes in the shells.

The thin shelled walnut has a pith at the stem end and a fine hole opposite. I proposed use of these natural holes in walnuts or other nuts having them as a path for electric surges, by feeding such nuts in rapid spaced sequence, while concurrently orienting and positioning them to receive the electric surge through the holes, as is the subject of my Patent Number 2,609,942, referred to above.

An object of the present invention is to provide an apparatus and method of electrically cracking solid shell nuts in an equally effective manner.

First, there will be an electric surge circuit capable of delivering surges of the necessary voltage hereinafter suggested and many hundreds of amperes, which may be had economically by setting up the necessary surge apparatus as fully described in my granted and issued Patent No. 2,583,380 dated January 22, 1952, which need not therefore be further described herein.

There are many nuts, notably filberts, that nature has not equipped with a current path through the nut, hence which cannot be successfully cracked by feeding, positioning and orienting, in normal air with a surge discharge finishing the job. There is still another obstacle to electric cracking of nuts in general that do not occupy shells which are figures of revolution, because they cannot be oriented by the grooved rollers disclosed in my Patent No. 2,609,942; therefore, to complete a series of electric nut cracking machines, suitable for commercial cracking of all solid and high dielectric strength shell nuts, I have invented a new method and machine for carrying out electric nut cracking of solid shell nuts. To successfully crack nuts electrically, at a commercial rate, it must be remembered that a stream (or several streams) of nut units must be withdrawn from a hopper or other storage means, then cracked as individual nuts, each by an independent surge. This is true of the walnuts and will always be true of every sort of nut whether it is ovoid in outline with holes, or generally round without holes.

It is an object of the present invention to move nuts from a supply device in a timed spaced series of nuts until they are in position between an opposed pair of suitable surge electrodes, to time current discharges across said opposed electrodes to meet each nut of said series of nuts, meantime so arranging each nut of said series that a current path through the body of each nut is available, that offers opposition to the electric surge discharge that is enough less than the opposition offered by a path that passes around the outside of the shell, to fix the path of the electric surge through the nut to be cracked.

Another object of this invention is to arrange multiple rows of nut pockets in a relatively wide carrier having high dielectric strength characteristics and to arrange for filling the pockets with one nut each by suitable mechanisms and timing the movement of the filled pockets to arrive at predetermined points on the upper running surface of the carrier, meanwhile directing liquid to partially submerge the carried nuts in suitable liquid, water being deemed to be the best. The nuts project substantially above the upper surface of the relatively shallow pockets; a liquid barrier exists all the way around the lower portion of the nut. Then, with a metallic electrode connection through the bottom of each pocket and a high tension electrode above and opposite, each nut will receive a surge through the nut, provided that a water or equivalent dielectric barrier has been placed in the space in the pocket not occupied by the nut.

My continuing invention in the field of electric nut cracking is a means of electrically cracking nuts, which in air have a lower electric flashover strength than electric puncture strength. A filbert is an example of such a nut. When in air a voltage is applied to pointed electrodes located on opposite sides of the nut, a discharge will take place over the exterior surface of the nut, i. e., flashover occurs. All attempts to cause electric puncture of the shell and hence to allow passage of a discharge through the interior of the nut will be unsuccessful. This is the experience with all nuts except those which have natural openings in the shell such as exist in the ends of an English walnut, as is seen in Patent No. 2,609,942.

Filberts cannot, with reasonable electric circuits, be cracked electrically by completely immersing the nut and electrodes in a much higher dielectric strength media, such as oil or water. It would be true that the path through the nut would be of lower dielectric breakdown strength than a path through just the oil or water. However, it is practical to crack nuts only by the application of surge voltages of high voltage and high amperage. The oil or water has a much higher dielectric constant than air or than the nut. The consequence of the high dielectric constant of the oil or water is that this media surrounding the nut acts as a condenser to by-pass the surge current around the nut. It would be necessary to cause an entirely unreasonable amount of current to pass through this surrounding media before the voltage built up between the electrodes would be sufficiently high to cause electric puncture through the nut.

My invention is to partially immerse the nut in a liquid; the preferred liquid is water, but nuts can be cracked in this manner when any liquid of suitably high dielectric strength is used. The liquid constitutes a high dielectric strength "barrier" which acts to prevent the electric discharge from passing over the outside of the nut. The minimum thickness of the liquid barrier is that just sufficient to prevent its puncturing electrically. The maximum allowable barrier thickness is reached when an undesirable fraction of the available energy is by-passed outside of the nut due to the presence of the relatively high dielectric constant liquid. The maximum and minimum allowable liquid barrier thicknesses are considerably different; hence the thickness used in practice is not critical. With such a suitable liquid barrier, breakdown is caused to occur through the nut and the shell is exploded away from the nut meat.

It is not necessary that the upper electrode touch the nut; a considerable air gap may exist. Further, it is not necessary that the lower electrode touch the nut; a thin layer of liquid may exist between the bottom of the nut and the lower electrode. The explanation of the fact that neither electrode need touch the nut lies in the complicated electric field distributions as a function of time, when surge voltage is applied between the electrodes. The essence of the situation is that the surge voltage electric field intensities are inversely proportional to the dielectric constants of the layers of dielectric materials across which the voltage is applied. Consider a nut floating with a thin layer of water between it and the lower electrode; also assume an air gap between the nut and the upper electrode. For convenience in thinking, we may represent the situation as follows: A layer of air, a layer of "nut material" and a layer of water all placed in series between a pair of electrodes.

When surge voltage is applied to the electrodes the time sequence of events will be as follows:

(1) The electric field intensity will be greatest in the air, less in the "nut material," and least in the water, roughly in the ratios of 80, 50 and 1.

(2) Electric breakdown of the air gap will occur leaving essentially the total voltage impressed across the series combination of "nut material" and water. The electric field intensity will be much greater in the "nut material" than in the water, roughly in the ration of 50 to 1.

(3) The high field intensity will cause electric breakdown to occur in the "nut material," leaving essentially the total voltage impressed across the layer of water.

(4) Electric breakdown of the water barrier will take place.

(5) Since now breakdown of all layers has been accomplished, the current will suddenly increase to a large value —with the result that the nut shell is exploded. The relative dielectric strength of the several materials is an important matter in the breakdown process; the air has the lowest electric breakdown strength and the liquid the highest—a fortuitous circumstance. The total electric field and the manner in which it allows, and changes with, progressive electric breakdown of the several materials is extremely complex; hence further discussion of it is omitted.

The very fact that the electric breakdown takes place in steps, i. e., most of the voltage is across the air alone, the nut alone or the liquid alone—in that time sequence, permits the very important practical advantage of operation with a surprisingly low voltage. Using a water barrier, filberts have been cracked with discharge capacitor voltages of less than 20 kv.

The preferred operating voltage and discharge capacitance are about 30 kv. and .01 mfd.

The nut may be placed, mechanically transported, or floated into position between the pair of electrodes.

It being deemed probable that good designing engineers, being supplied with the foregoing principles of operation, could design a considerable number of machines to creditably assist in applying said principles, therefore it is deemed proper to give drawings of the one we prefer, though no machine claims are appended. The figures are as follows:

Fig. 3 is an enlarged fragmentary view of a nut pocket with the operating end of a high tension electrode about to "fire"; and Fig. 4 is a dagrammatic illustration of the firing system, with legends that are explanatory.

Figure 1:
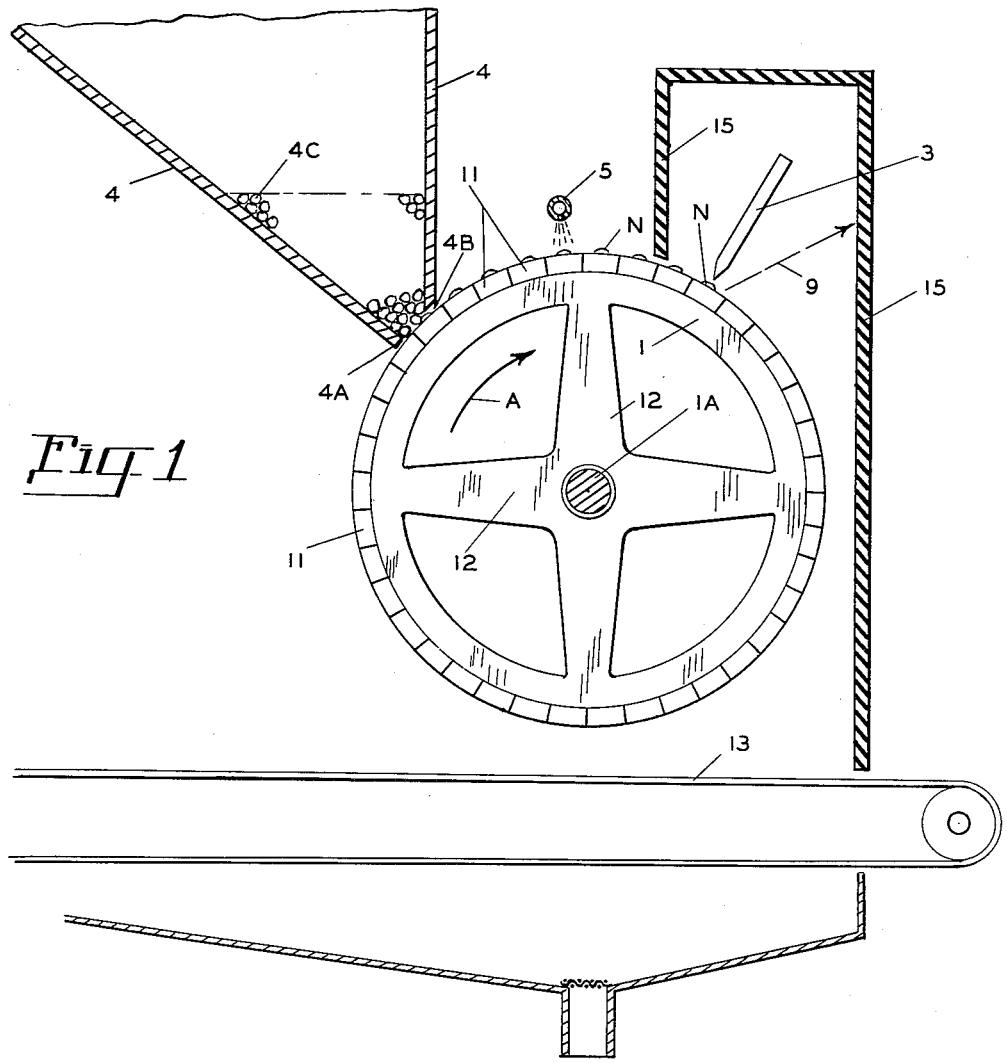
Fig. 1 is a general organization shown as a schematic end view.
Figure 2:
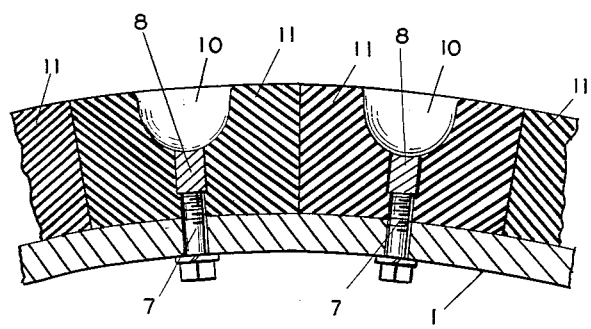
Fig. 2 is an enlargement of a fragmentary part of the drum 1.

Describing the drawings in greater detail: The drum 1 is of metal and the pocketed bars 11 are secured to the perimeter of the drum 1 by bolts 7 that have been provided with threaded openings in the metal bars 8, so they serve as low tension electrodes to a row of high tension electrodes 3, which explode nuts contained in the moulded pockets 10. The pockets 10 are small enough to remove a single nut each as they pass under the nut supply 40 in the hopper 4. The reserve of nuts in the hopper 4 is not critical and may be several feet deep, though if it can be maintained at a depth less than that the result will be less friction load on the drum and the pocketed moulded rubber bars.

The clearance between the pocketed bars 11 and the lower side of the hopper at 4B is such that only those nuts that occupy one of the pockets 10 can pass out of the hopper on the way to the cracking electrodes. The bars 11 as actually made and used, also the drum 1, for example only as a filbert cracker, are 31.5 inches long and the number of bars is 80, which could not be conveniently shown on the drawing on account of much reducing the other parts of the figure.

As the filled pockets, each containing a nut, pass upwards in the direction indicated by the arrow A, they pass under a liquid spray pipe 5 having spray openings so spaced that the space in the pockets 10, not occupied by a nut N, will be filled with water or other liquid having suitable dielectric strength for the purpose as fully explained supra.

The drum revolves at 2.5 revolutions per minute and as the nut containing pocket 10 starts over the top of the drum 1 (including the bars 11) the liquid-filled pockets will gradually spill out as the carried nuts approach cracking position until the amount of remaining liquid is just right.

The insulation of the spray pipe, the only available path whereby the high voltage surges could go astray, is made surge proof in a very simple manner. The water supply is furnished through a garden-type hose wound into a helical coil, thus providing a considerable inductance. High ohmic resistance is also concurrently obtained by the long length of the narrow water column.

Explaining the diagram of Fig. 4. Actually the drum with the nut pockets, 18 in each row, revolves under the electrodes set askew to the rows of pockets, so spaced and set that each nut will identically have an electrode as it reaches cracking position. Thus the drum revolves under the stationary electrodes, but in diagramming this it was convenient to make the diagram as if the electrodes moved. There will of course, in duplicating the machine we now have, be 18 electrodes and the surge circuit will also have 18 points on the distributor, so timed with the nut cracker that an electrode will deliver an accurately timed surge, just as a nut arrives to be cracked in the position of both nut and high tension surge electrode 3, as shown in Fig. 3, where the water or other dielectric "barrier" 3B has diminished the submergence of the nut N to the correct amount. It is highly expedient to employ the soft rubber tube tip R3 on the electrode 3.

In the drawing of the diagram 3, nut pockets rotating under electrodes are presumed to have been charged with a proper liquid barrier 3B and to have tipped to the correct angle, as shown in Fig. 3, or nearly so. Pocket No. 1 is approaching firing position in the bottom row as are all of the nuts in that row. In the top row, pocket No. 1 has been fired just one-sixtieth of a second before the nut in pocket No. 2, which is being fired, the nut in pocket No. 3 will fire one-sixtieth of a second from the instant that No. 2 fired; thus the firing time is fixed by the angle represented by the broken lines representing the "askew" setting of the electrodes with respect to the centerlines of the approaching nuts. The speed of approach is 60 per second; the rated capacity of the surge circuit as described in the patent, provided with an 18 point distributor which is accurately timed with the rotation of the drum 1.

Numeral 9 indicates an arrow representing a characteristic trajectory of nut and particularly shell fragments; 15 indicates a rubber or rubber lined housing to prevent damage to the nut meats which in electric cracking are not injured; 13 represents a conveyor to remove cracked shell and nut meats for drying and winnowing and 17 represents a drain to dispose of used liquid barrier material.

Having fully disclosed my invention and illustrated and described apparatus which though unclaimed is useful in carrying out the invention, what I claim as new and desire to secure by Letters Patent, is:

1. The method of electrically cracking nuts which comprises subjecting a nut to a high voltage and high current electric surge discharge and preventing said discharge from flashing around said nut by surrounding a portion of said nut between said electrodes with a barrier of a liquid having sufficient dielectric strength to cause said discharge to pass through said nut.

2. The method of electrically cracking nuts which comprises subjecting a nut to a high voltage and high current electric surge discharge and preventing said discharge from flashing around said nut by surrounding a portion of said nut between said electrodes with a barrier of water so as to cause said discharge to pass through said nut.

3. The method of electrically cracking nuts, which comprises positioning a nut between spaced electrodes, producing a high voltage high current electric surge discharge between said electrodes, and blocking the path for said discharge around said nut with a barrier of liquid of sufficient dielectric strength to cause said discharge to pass through said nut.

4. The method of electrically cracking nuts, which comprises positioning a nut between a pair of spaced electrodes, producing a high voltage high current electric surge discharge between said electrodes, and blocking the path for said discharge around said nut with a barrier of liquid in contact with one of said electrodes and out of contact with the other of said electrodes and of sufficient dielectric strength to cause said discharge to pass through said nut.

References Cited in the file of this patent

UNITED STATES PATENTS

| | | |
|---|---|---|
| 2,248,327 | Bainer et al. | July 8, 1941 |
| 2,583,380 | Kofoid | Jan. 22, 1952 |
| 2,601,421 | Thaning | June 24, 1952 |
| 2,609,942 | Kofoid | Sept. 9, 1952 |
| 2,661,784 | McMillan | Dec. 8, 1953 |